US 9,286,458 B2

(12) United States Patent
Geosimonian

(10) Patent No.: US 9,286,458 B2
(45) Date of Patent: *Mar. 15, 2016

(54) SYSTEMS AND METHODS FOR ONLINE IDENTITY VERIFICATION

(71) Applicant: Rakuten, Inc., Tokyo (JP)

(72) Inventor: Armen Geosimonian, Studio City, CA (US)

(73) Assignee: RAKUTEN, INC., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/510,938

(22) Filed: Oct. 9, 2014

(65) Prior Publication Data

US 2015/0154390 A1   Jun. 4, 2015

Related U.S. Application Data

(63) Continuation of application No. 14/072,504, filed on Nov. 5, 2013, now Pat. No. 8,862,891, which is a continuation of application No. 13/235,085, filed on Sep. 16, 2011, now Pat. No. 8,595,509, which is a continuation of application No. 12/822,135, filed on Jun. 23, 2010, now Pat. No. 8,024,578, which is a continuation of application No. 12/001,500, filed on Dec. 11, 2007, now Pat. No. 7,765,408, which is a continuation of application No. 10/385,406, filed on Mar. 7, 2003, now Pat. No. 7,308,581.

(51) Int. Cl.
| | |
|---|---|
| *H04L 29/06* | (2006.01) |
| *G06F 21/32* | (2013.01) |
| *G06F 21/34* | (2013.01) |
| *G06K 9/00* | (2006.01) |
| *G09B 5/00* | (2006.01) |
| *G09B 7/00* | (2006.01) |

(Continued)

(52) U.S. Cl.
CPC ............... *G06F 21/32* (2013.01); *G06F 21/34* (2013.01); *G06K 9/00288* (2013.01); *G06K 9/00906* (2013.01); *G09B 5/00* (2013.01); *G09B 7/00* (2013.01); *H04L 9/0866* (2013.01); *H04L 9/3231* (2013.01); *H04L 63/0861* (2013.01)

(58) Field of Classification Search
CPC .................................................. H04L 63/0861
USPC ........................................................ 713/186
See application file for complete search history.

(56) References Cited

U.S. PATENT DOCUMENTS

| | | | |
|---|---|---|---|
| 4,486,180 | A | 12/1984 | Riley |
| 4,764,120 | A | 8/1988 | Griffin et al. |

(Continued)

OTHER PUBLICATIONS

Letter from Armen J. GeoSimonian to Jackie Jackson Winthrop with attachments. Mailed Mar. 7, 2002 and received Mar. 11, 2002. 6 pages.

*Primary Examiner* — Longbit Chai
(74) *Attorney, Agent, or Firm* — Hubbs, Enatsky & Inoue PLLC

(57) ABSTRACT

A system controlling online access to a study course verifies the identity of an individual taking a study course over a global computer network from a first computer at a node of the network. The first computer has a biometric identification program and communicates over the network with a second computer that is at a network node other than a node of the first computer. The second computer includes study program material. The first computer operates a biometric reader, which obtains a first set of biometric data from the individual and a second set of biometric data from the individual while access is granted to course material. The biometric identification program compares the first set of data with the second set of data to make a verification of the identity of the individual and communicates the verification to the second computer.

17 Claims, 6 Drawing Sheets

(51) Int. Cl.
*H04L 9/08* (2006.01)
*H04L 9/32* (2006.01)

(56) References Cited

U.S. PATENT DOCUMENTS

| | | | |
|---|---|---|---|
| 5,195,033 A | 3/1993 | Samph et al. |
| 5,204,813 A | 4/1993 | Samph et al. |
| 5,218,528 A | 6/1993 | Wise et al. |
| 5,513,994 A | 5/1996 | Kershaw et al. |
| 5,857,028 A | 1/1999 | Frieling |
| 5,915,973 A | 6/1999 | Hoehn-Saric et al. |
| 5,947,747 A | 9/1999 | Walker et al. |
| 5,957,699 A | 9/1999 | Peterson et al. |
| 5,987,149 A | 11/1999 | Poor |
| 6,146,148 A | 11/2000 | Stuppy |
| 6,155,840 A | 12/2000 | Sallette |
| 6,263,447 B1 | 7/2001 | French et al. |
| 6,282,658 B2 | 8/2001 | French et al. |
| 6,310,966 B1 | 10/2001 | Dulude et al. |
| 6,321,339 B1 | 11/2001 | French et al. |
| 6,341,212 B1 | 1/2002 | Shende et al. |
| 6,418,298 B1 | 7/2002 | Sonnenfeld |
| 6,496,936 B1 | 12/2002 | French et al. |
| 6,526,434 B1 | 2/2003 | Carlson et al. |
| 6,612,928 B1 | 9/2003 | Bradford et al. |
| 6,618,806 B1 | 9/2003 | Brown et al. |
| 6,709,333 B1 | 3/2004 | Bradford et al. |
| 6,725,383 B2 | 4/2004 | Kyle |
| 6,892,201 B2 | 5/2005 | Brown et al. |
| 6,973,581 B2 | 12/2005 | Chung et al. |
| 7,308,581 B1 | 12/2007 | Geosimonian |
| 7,765,408 B1 | 7/2010 | Geosimonian |
| 8,024,578 B2 | 9/2011 | Geosimonian |
| 8,595,509 B2 | 11/2013 | Geosimonian |
| 2001/0036622 A1 | 11/2001 | Richter et al. |
| 2001/0039003 A1 | 11/2001 | Huang |
| 2001/0054149 A1 | 12/2001 | Kawaguchi et al. |
| 2002/0031230 A1 | 3/2002 | Sweet et al. |
| 2002/0031752 A1 | 3/2002 | Kouba et al. |
| 2002/0052860 A1 | 5/2002 | Geshwind |
| 2002/0112171 A1 | 8/2002 | Ginter et al. |
| 2003/0073065 A1* | 4/2003 | Riggs ............... 434/350 |
| 2003/0159052 A1 | 8/2003 | Lee et al. |
| 2004/0015243 A1 | 1/2004 | Mercredi et al. |
| 2004/0064728 A1 | 4/2004 | Scheurich |
| 2012/0002847 A1 | 1/2012 | Geosimonian |

* cited by examiner

SYSTEMS AND METHODS FOR ONLINE IDENTITY VERIFICATION

REFERENCE TO PRIORITY DOCUMENTS

This application is a continuation of U.S. patent application Ser. No. 12/822,135, filed Jun. 23, 2010, which is a continuation of U.S. patent application Ser. No. 12/001,500, filed Dec. 11, 2007, now U.S. Pat. No. 7,765,408, which is a continuation of U.S. patent application Ser. No. 10/385,406, filed Mar. 7, 2003, now U.S. Pat. Nos. 7,765,408 7,308,581. Priority of the aforementioned filing dates is hereby claimed, and the disclosures of the aforementioned patent applications are hereby incorporated by reference in their entirety.

BACKGROUND

1. Field of the Invention

The invention relates to online identity verification systems and methods, particularly those associated with online study courses.

2. Description of the Related Art

With the proliferation of online commerce and education, the need for improved ways of administering online study courses and examinations has increased. Ensuring the integrity of an examination or the study of a course online is difficult, because the user is at a remote location, such as at home, a library, or an office, where he or she cannot be monitored by an exam or course administrator or a proctor.

Presently, online education providers such as online traffic schools who provide driver education courses have limited ways of verifying the identity of the individuals who access their courses online. For example, most online traffic schools request identifying information such as birthdays, drivers license numbers, social security numbers, passwords, addresses, and the like, most of which can easily be obtained by imposters. Others require that such information be provided periodically during the course of an examination. None of these methods, however, provide sufficient assurances that the person accessing the course or taking the examination is the actual person who is required to take the course or the examination.

In addition, present systems for identity verification cannot be deployed in an efficient, practical and inexpensive manner that makes them feasible for use by a significant segment of online education resource providers. Thus, there is a need for improved online identity verification systems that can be used by online education providers. The present invention solves these and other problems associated with the state of the art.

SUMMARY

Verifying the identity of an individual taking an online study course from a network node includes obtaining and storing in a memory a first set of data representative of an image of a photo identification card of the individual, and a second set of data representative of one or more images of the individual's face. A face recognition program compares the first and second sets of data to verify the identity of the individual. The individual is provided with online access to course material. The method can also include obtaining one or more additional sets of data representative of one or more images of the individual's face taken while access to the course material is provided, and using the face recognition program to compare the one or more additional sets of data with the first set of data, the second set of data, or both the first and second sets of data to make one or more additional verifications of the identity of the individual.

One computerized method for verifying the identity of an individual taking an online study course can include obtaining and storing in a memory a first set of biometric data representative of one or more physical characteristics of the individual. The first set of data is obtained by the individual's computer. The method also includes obtaining and storing in the memory a second set of biometric data from a third party computer. The second set of biometric data is representative of one or more physical characteristics of the individual. The method further includes comparing the first set of data to the second set of data to verify the identity of the individual, and providing the individual with access to course material upon verification of identity. The method can also include obtaining one or more additional sets of data representative of one or more physical characteristics of the individual while access to the course material is provided, and comparing the one or more additional sets of data with the first set of data, the second set of data, or both the first and second sets of data to verify the identity of the individual.

In accordance with another aspect of the invention, a computerized method for verifying the identity of an individual taking an online study course includes obtaining and storing in a memory a first set of data representative of at least one image of the individual's face. Access to the study course is provided. Then a second set of data representative of at least one image of the individual's face, which is taken while access to the course material, is provided. A face recognition program compares the first set of data to the second set of data to verify the identity of the individual.

In accordance with another aspect of the invention, a computerized method for verifying the identity of an individual taking a study course over a computer network from a computer at a node of the network includes receiving a request from a web browser associated with the computer for access to a web page having study course material. The web page that is accessed can have an imbedded field that receives a value from the individual's computer. The value can be an access value if a camera associated with the individual's computer is activated, or it can be a decline value if the camera is not activated or if the individual's computer does not verify the identity of the individual. The method can also include verifying that the value inserted into the imbedded field is an access value and granting access to the course material.

In accordance with another aspect of the invention, a system for verifying the identity of an individual taking an online study course includes a centralized computer that has study course material and personal information associated with the individual. The system also includes a remote computer in communication with the centralized computer. The remote computer has a biometric identification program and memory for storing biometric data. A biometric reader, which can be operated by the remote computer, is also included. The biometric reader can obtain a first set of biometric data from the individual, and a second set of biometric data from the individual while access is granted to the course materials. The biometric identification program can compare the first set of data with the second set of data to verify the identity of the individual and communicate the verification to the centralized computer.

In accordance with another aspect of the invention, a program product comprises a computer-readable medium and computer-executable instructions recorded on the computer-readable medium for performing a method. The method includes activating a biometric reader that communicates with a user's computer and searching for a unique data field that is imbedded in a web page of a remote computer that has online study course material. The method can also include inserting a value into the data field, and the value can be an access value if the biometric reader is activated.

Other objects and features of the present invention will become apparent from consideration of the following description taken in conjunction with the accompanying drawings.

DETAILED DESCRIPTION

Figure 1:
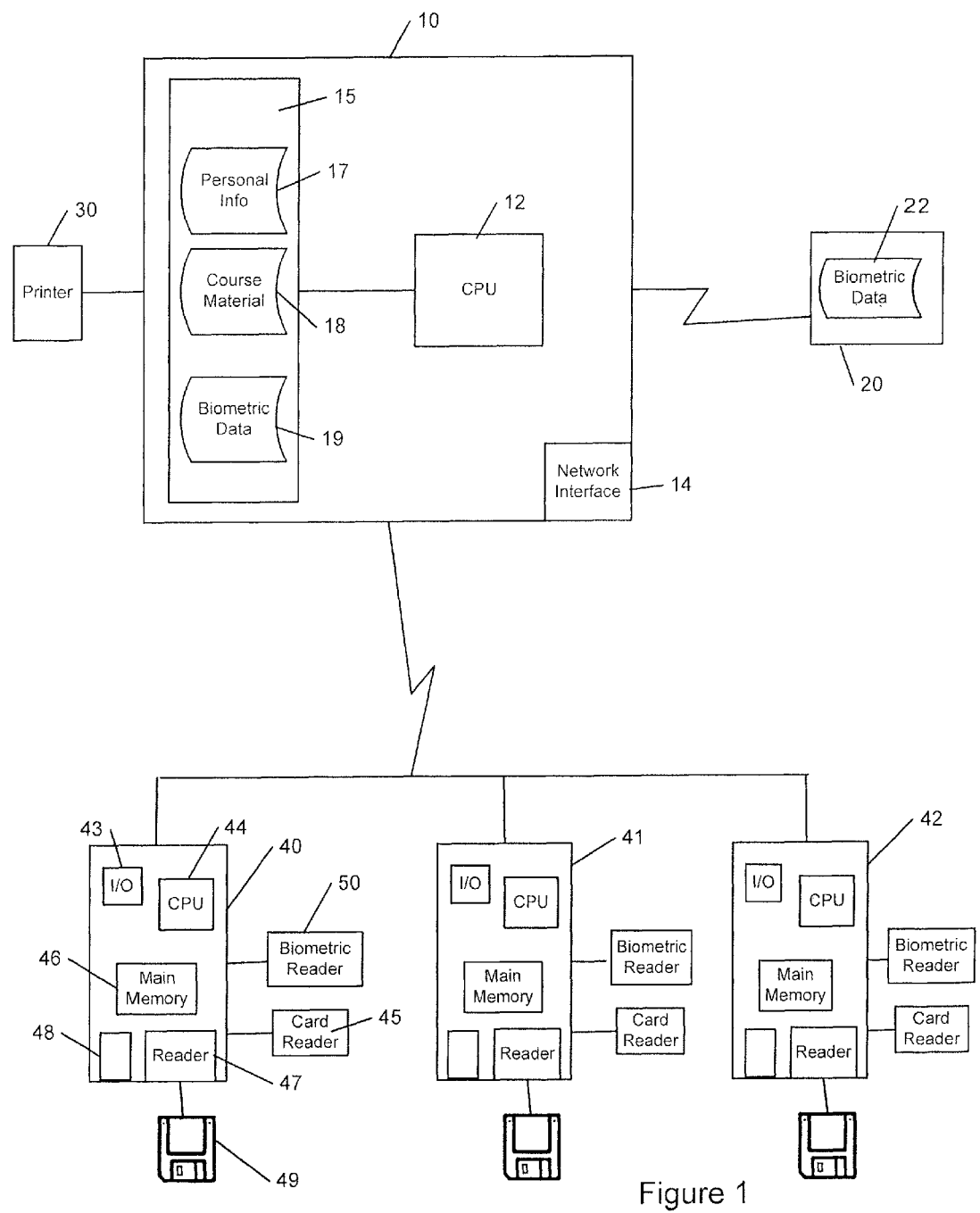
FIG. 1 is an illustration of an identity verification system for an online study course.

FIG. 1 shows a networked computer system for verifying and identifying an individual taking a study course over a global computer network. The system includes a central server computer 10 that communicates with one or more user computers 40, 41, 42 and a printer 30. The central computer 10 can be any computer at a node within a computer network that manages network resources, such as a file server, a database server, a network server, or a web server, and the like.

The central server includes a central processing unit (CPU) 12, a network interface 14 and a memory 15 for storing data. The memory 15 can include a storage device, a volatile memory such as any type of RAM, and a nonvolatile memory, such as ROM, PROM, EPROM, and EEPROM. The storage device can be of any type known to those of skill in the art, such as magnetic tape, floppy disk, hard disk, CD, DVD, magneto-optical disk, and the like. The storage device can be installed as single drives or grouped into libraries of media drives.

The data stored in the memory 15 can include stored user information data 17, study course material data 18, and biometric data 19. The study course material data 18 can include web pages that include course material. The web pages can have imbedded data fields for receiving an access value from the user computer 40, 41, or 42. Biometric data 19 refers to data representative of a person's physiological or behavioral characteristics, such as fingerprints, irises (or other ocular anatomy), voice patterns, facial patterns, hand measurements, and signatures for identification and verification purposes.

The central server computer 10 communicates with the user computers 40, 41, 42 through a global computer network such as the Internet. The user computers 40, 41, and 42 can be any computer that an individual may use to access online study course material, such as a home computer, a school computer, a library computer, a work computer, a coffee shop computer, and the like. The terms "user computer", "user's computer", and "individual's computer" are used interchangeably herein.

Each of the computers 10, 40, 41, and 42 is a node of the global computer network. Details of one computer 40 will be understood to apply to the others 41, 42. The user computer 40 includes a CPU 44, and input/output devices 43, such as a keyboard, a display, and a printer. The user computer 40 can also include various types of memory. For example, it can have a direct access storage device (DASD) 48, such as magnetic disk or CD, DVD, or magneto-optical Disk, which can be used to store biometric data. It can also have an operating memory 46 that includes volatile (i.e., main) memory, and nonvolatile memory, such as any of magnetic disk or CD, DVD, or magneto-optical disk. Each computer 40 includes a program product reader 47 that accepts a program product storage device 49, from which the program product reader can read data or onto which it can write data. The program product reader 47 can comprise, for example, a disk drive and the program product storage device 49 can comprise a computer-readable medium, such as a magnetic floppy disc, CD-R disc, CD-RW, or DVD data disc, or any type of computer-readable medium known to those of skill in the art.

Also coupled to the computer is a biometric reader 50, such as a camera, a fingerprint reader, a microphone, an eye scanner, an electronic signature pad, or a hand scanner. The biometric reader 50 is controlled by a biometric identification program, which can be stored in the volatile memory 46 or some other memory of the computer 40. Alternatively, the program can be stored at a different location and retrieved for execution. For example, the program can be retrieved from the program product 49, or can be a browser plug-in obtained from the central server 10, or can be executed from the central server 10.

In one embodiment, the central server 10 also communicates with a third party computer 20 from which it can obtain biometric data 22, such as data representative of a user's signature, voice, ocular characteristics, fingerprints, hand geometry, and/or facial image or photograph. The third party computer can, for example, be controlled or managed by a governmental agency, such as the California Department of Motor Vehicles or the like, which stores biometric data for all of those individuals who have a drivers license in California. Alternatively, the third party computer can be controlled or managed by a private company that stores and manages biometric data. The central server 10 can store the biometric data 22 that it receives from the third party computer 20 in its memory 15. Although not shown in FIG. 1, the third party computer can alternatively communicate directly with the user computer 40, which can store data received from the third party computer in the DASD 48 or memory 46.

In one embodiment, the biometric reader 50 is a camera, and the biometric identification program is a face recognition program, such as FaceIt® by Identix, Inc. The face recognition program, which the user computer 40 can execute, performs facial matching and verification functions. The camera 50 is controlled by the face recognition program. Alternatively, the face recognition program is executed by the central server 10, which communicates with the user computer 40.

To begin user verification, the user computer 40 is turned on and the face recognition program is launched. The face recognition program automatically activates the camera 50. The camera can begin taking images of the user or can start the imaging process later. The user attempts to access study course material by communicating with the central server 10 through a web browser at the user computer 40. The web browser can be a custom browser that is configured for operation as described herein, or it can be a browser that is commercially available, such as Microsoft "Internet Explorer"®. The browser is used to access one or more web pages from the central server 10 to retrieve the study course material. The face recognition program searches through every web page received by the web browser for an imbedded data field having a unique name. The data field can be a meta data field or a visible data field. When the face recognition program identifies the data field, it inserts a value into the data field. In one embodiment, if the camera is activated, the face recognition program inserts a data field with an access value. If the camera is not activated, then no access value is inserted. Instead, a "decline" value or no value is inserted. In another embodiment, an access value is not automatically inserted in the data field until after the face recognition program indicates a verification. Thus, in the second embodiment, access to the course materials is not granted until after verification. In either case, once the data field of the received page is populated with a value, a CGI script executed by the central server 10 identifies the access value when a "continue" web link of the received page is selected, and provides access to a web page having study course materials, or it identifies the "decline" value and denies access to any web pages having course materials.

As mentioned above, access to course materials can be granted either before or after verification is made. To verify the identity of the user, the camera 50 is pointed toward the user and takes an initial template image or set of images of the user's face. This first set of data is transmitted to the central server 10 and stored in the memory 15. It can also be stored in the DASD 48 or the main memory 46 of the user's computer 40. The first set of image data can comprise one image of the user or a set of two or more images of the user. Next, the camera takes a second set of one or more images of the user. The second set of images can be one image or multiple images taken periodically, such as every five, ten, fifteen, or thirty minutes, or continuously, such as every millisecond while the camera is on. The face recognition software in real-time compares the one or more images in the second set with the one or more images in the first set to verify that the user in front of the camera 50 at the time of the second images is the same individual as that in the first set of images. If verification is made, the user is either granted initial access or continued access to course material. If verification is not made, then access to the study materials will be denied through any of the following mechanisms. In a first mechanism, the face recognition software shuts down, which can also automatically deactivate the camera and shut down the web browser. No further web pages will be provided, because either the web browser will be shut down or the face recognition software will not be on and will consequently not insert an access value into the imbedded data fields that reside in each of the web pages displaying the study course materials. In a second mechanism, the face recognition software signals the camera 50 to turn off. If the camera is off, then the face recognition software will not insert an access value into the imbedded data fields on the web pages. Instead it will insert either no value, a "decline" value, or a failure message to the web page.

The face recognition software can also detect facial movements to confirm that the user's face is a live face and not a mask or photograph image. If facial movements are not detected, then the face recognition software will either shut down, or it will deactivate the camera as described above.

In an alternative embodiment, access to course materials continues even after the software is shut down or the camera is deactivated, but the user is not provided with a certificate of course completion. Instead, the user is notified that identity verification has failed and that he or she will not be provided with course completion credit.

The camera 50 can also be used to image the user's eye rather than his whole face. This can also be accomplished using an iris scanner instead of a camera.

When the first set of images are taken by the camera 50, they can be transmitted to the central server 10 and stored in the memory 15, and they can also be stored in the DASD 48 or main memory 46 of the user's computer. The second set of images can also be transmitted to the central server and stored in the memory 15 there, and they can also be stored in the DASD 48 or main memory 46 of the user's computer. When the camera 50 is deactivated and further access is denied; if a copy of the first set of images is stored in the DASD 48 or the main memory 46, the face recognition program causes the first set of images stored in the DASD 48 or the main memory 46 to be deleted. This is a precaution that denies the user the opportunity to manipulate the images. The next time the user tries to access the course material, the first set of images can be transmitted from the central server 10 to the DASD 48 or main memory 46 of the user computer 40. The face recognition software and camera will again be activated and will take a new set of one or more images. The new set of images will be compared in real-time by the face recognition software with the first set of images. Thus, the system makes it difficult for the user to manipulate or alter the first set of images that were taken.

In another embodiment, the face recognition software can instead be executed from the central server rather than the user's computer. In that case, the first and second set of images are transmitted to the central server for analysis by the face recognition software. If a verification is not made, the central server will deny access or discontinue further access to the study course materials.

In another embodiment, the biometric reader 50 is a fingerprint reader. The system operates in the same manner as described with respect to the camera, except that the biometric identification program is fingerprint recognition software rather than face or eye recognition software, and the biometric data being analyzed are representative of fingerprints rather than images of the face or eyes.

In another embodiment, the biometric reader 50 is a microphone. The system operates in the same manner as described above, except that the biometric identification program is voice recognition software, and the biometric data being analyzed is representative of the user's voice.

In another embodiment, the biometric reader 50 is an eye scanner as discussed above.

In another embodiment, the biometric reader is an electronic signature pad. The system operates in the same manner as described above, except that the biometric identification program is a signature analysis program, and the biometric data being analyzed is representative of the user's signature.

In still another embodiment, the biometric reader is a hand scanner. The system operates in the same manner as described above, except that the biometric identification program is a hand geometry recognition program, and the biometric data being analyzed is representative of the user's hand geometry.

In still another embodiment, the user computer 40 has a card reader 45 in addition to the biometric reader 50. The card reader 45 can obtain a first set of biometric data imbedded in a microchip or a magnetic strip on the card. The first set of biometric data can be stored on the user's computer 40 and/or the central server 10. Additional sets of biometric data obtained while the user is accessing the study course materials can be compared with the first set of biometric data by a biometric identification program. As described above, the comparison can be performed by a biometric identification program on the user's computer or the central server.

In another embodiment, the first set of biometric data is obtained by the central server 10 or the user's computer 40 from a third party computer 20 that stores biometric data. For example, when the user computer 40 accesses the central server 10, the central server 10 identifies the user and accesses the user's personal information data from the personal information data 17 stored in the memory 15. It uses that data to retrieve a first set of biometric data corresponding with the identified user from the third party computer 20. For example, the third party computer can be associated with a governmental agency such as the Department of Motor Vehicles for the state or county in which the user is licensed. The user's personal information can include the user's drivers license number. The central server can use the user's drivers license number to retrieve a first set of biometric data from the Department of Motor Vehicles biometric database 22. That data can be stored in the central server 10 and it can be transmitted to the user's computer from the central server. Alternatively, the user can retrieve the biometric data from the third party computer and forward it to the central server.

Next, the biometric reader 50 can obtain a second set of live biometric data from the user while the user is accessing the server 10. And as described above, a biometric identification program (BIP) can compare the two sets of data to make an identification. As described above, the BIP can be stored on the central server 10 or on the user's computer 40. If it is stored on the central server 10, then the comparison is performed by the central server 10. If the BIP is stored on the user's computer, then the comparison is performed by the user's computer. The user will have access to study course materials as long as an identification is made.

Figure 2:
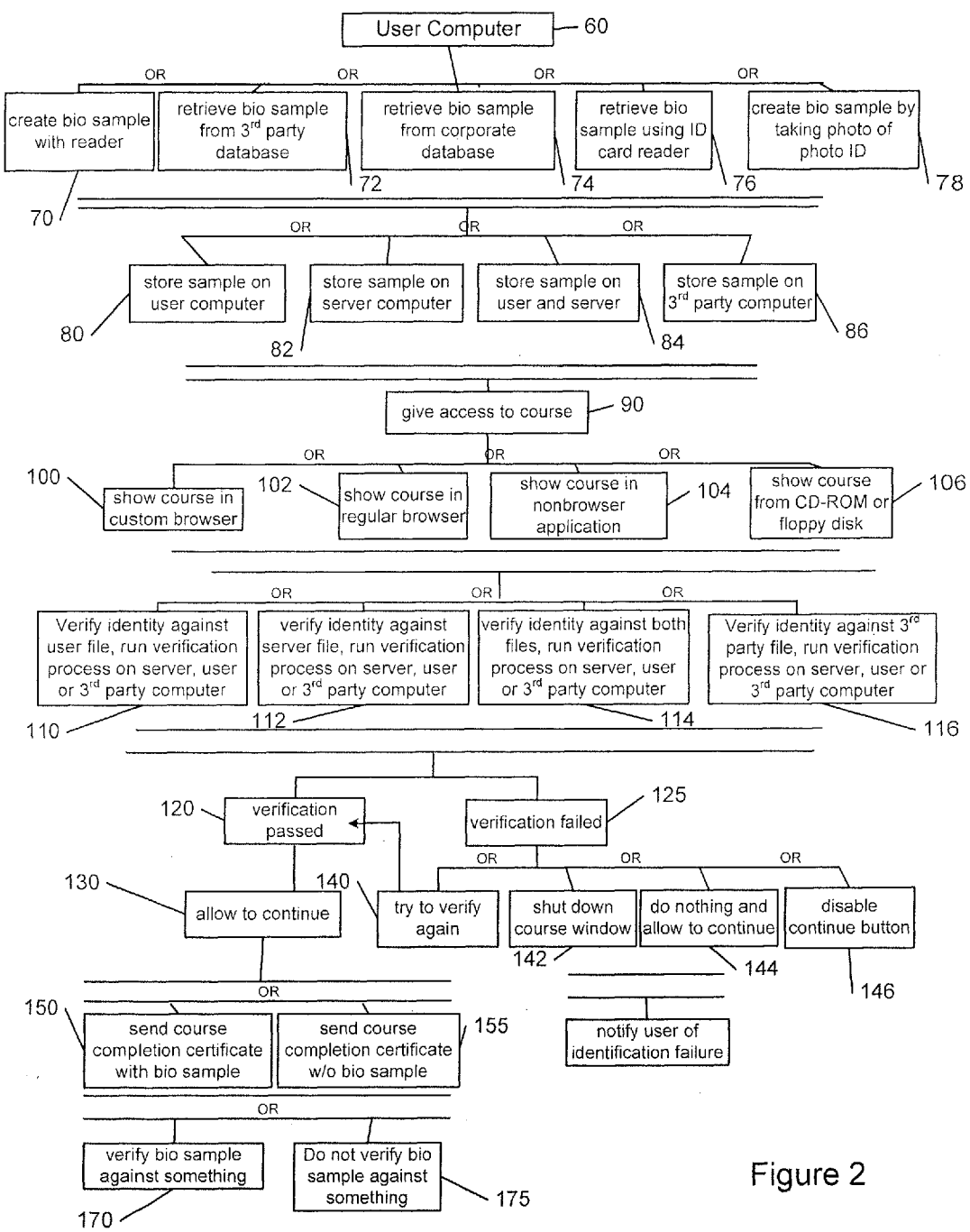
FIG. 2 is a block diagram of a computerized method for verifying the identity of an individual taking a study course over a global computer network.

FIG. 2 is a generalized block diagram laying out the alternative data pathways for a computerized method for verifying and identifying an individual (also referred to as a user herein) taking a study course over a global computer network, such as the Internet. The user uses his own user computer at 60 to create or retrieve a biometric sample. The biometric sample can be created using a biometric reader to obtain a sample from the user at 70, or by taking a photograph of the user's photo identification at 78. Alternatively, the user's computer can retrieve a biometric sample from a third party database at 72, a corporate database at 74 or by using a smart identification card read by a smart card reader at 76. Next, the sample is stored in a memory of the user's computer at 80, in a memory of the server computer at 82, in both a memory of the user computer and server computer at 84, or in a memory of a third party computer at 86. The server computer then provides the user computer with access to course material at 90. The course material is shown in a custom browser at 100, in a conventional browser at 102, in a nonbrowser application at 104, or from a CD-ROM, DVD, or floppy disk at 106. Next the user's identity is verified against a user file at 110, a server file at 112, against both a user file and a server file at 114, or against a third party file at 116. In each case, the verification process is executed on either the server computer, the user's computer, or a third party computer. If verification is not indicated at 125, then one of several alternative operations takes place: verification is again attempted at 140, the course window is shut down at 142, the user is allowed to continue 144, or the continue button is disabled at 146. If verification not indicated at any of steps 140, 142, 144, or 146, the user is notified of the verification failure. The notification can be before the user completes the course or after. If verification is indicated at 120, then the user is allowed to continue at 130. Once the user completes the course, a course completion certificate can be sent to the user. The course completion certificate can either have a biometric sample imbedded into it at 150, or it can be sent without a biometric sample at 155. The biometric sample can be further verified against a previously verified or authenticated sample at 170, or further verification can be avoided at 175.

Figure 3:
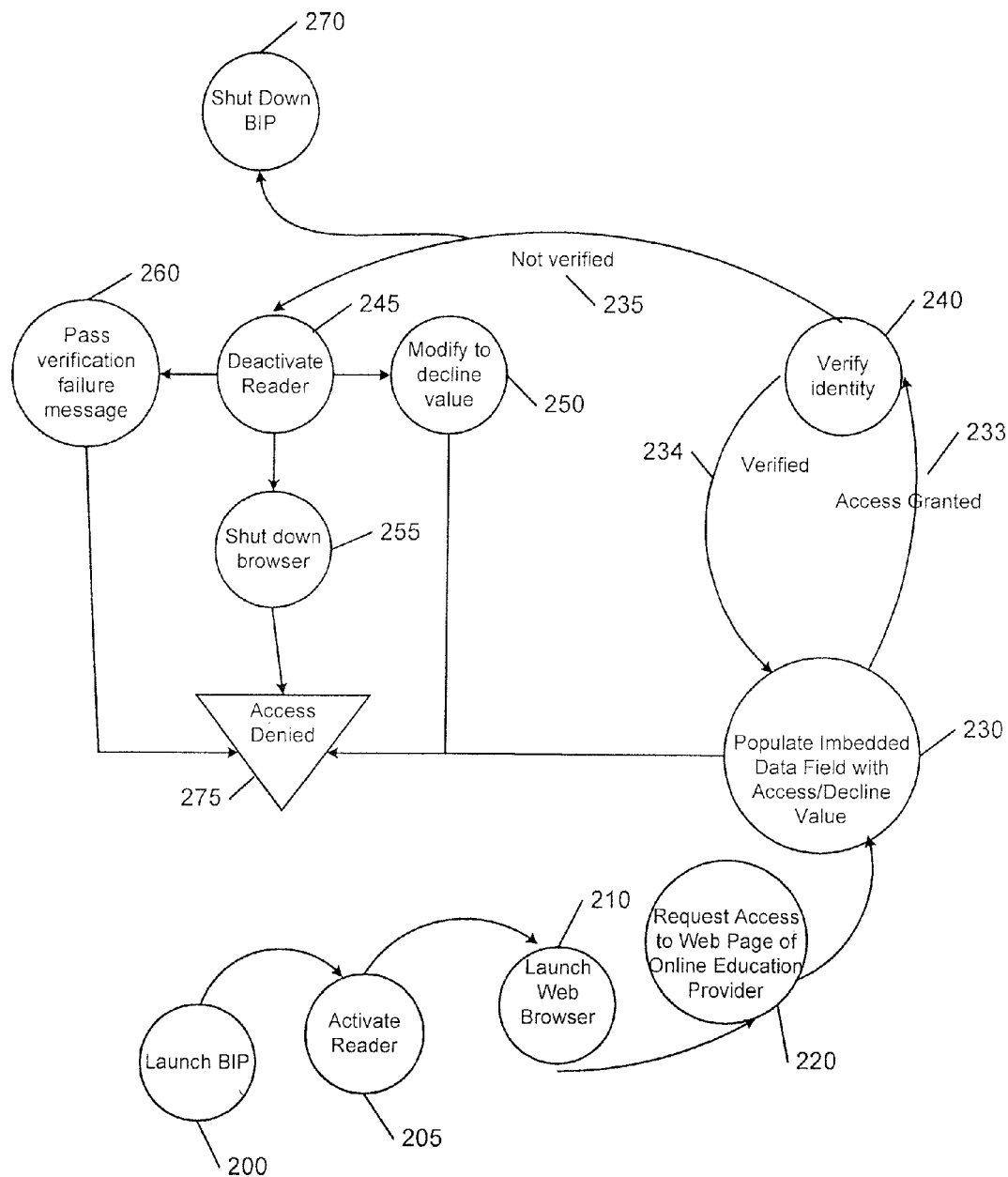
FIG. 3 is a flow diagram of a computerized method for verifying the identity of an individual taking a study course over a global computer network.

FIG. 3 shows a flow diagram of a computerized method for verifying and identifying an individual taking a study course over a global computer network, such as the Internet. In the first operation 200, the user turns on his computer at a network node and launches a biometric identification program (BIP). The BIP serves two purposes: it verifies the identity of the user; and it enables access to the web pages that include the study course material on the web site of the online education provider. The BIP automatically activates the biometric reader at step 205. Alternatively, the user can manually activate the biometric reader. In either case, the BIP is aware of whether or not the biometric reader is activated. The BIP then automatically launches a customer browser at step 210. Alternatively, the web browser can be a conventional web browser such as Microsoft "Internet Explorer®" The browser is configured to ensure data security and confidentiality as between the user computer and the server computer. Alternatively, the user can manually launch the browser rather than having the BIP automatically launch the browser. The browser is used to request access to a web page with study course materials from a web site of an online education provider at step 220. The first web page can be a control panel that does not include study course materials but instead includes data entry fields to collect personal information from the user. The first web page can include an imbedded data field that can receive an access/decline value. In accordance with the web page HTML specification, the imbedded access/decline data field can have a unique name, and the BIP can search the web page for a data field with that name. The imbedded data field can be a meta data field or a visible data field. Once the BIP finds the access/decline value data field, it populates the data field with a value, as indicated at 230. The value can be an access value if the biometric reader is activated, or it can be a decline value or no value if the biometric reader is not activated. After entering data at the control panel web page, the user then requests access to the next web page or a web page that provides study course materials by sending a request for the page. The request can be initiated by clicking on a web page link from the currently viewed page. In the illustrated embodiment, the request involves sending the web page populated with the access/decline value back to the web site server where a common gateway interface (CGI) script is executed. The CGI authenticates the request, such as by recognizing that it has been received from the custom browser or through other security safeguards with conventional browsers, and then the CGI script analyzes the data in the web page, including the imbedded access/decline value data field. If the data field is populated with a decline value or no value, then access to the next web page is denied by the CGI script at step 275. If the value is populated with an access value, then access to the next web page is granted, as indicated at 233.

For the case where access is granted, as indicated by 233, a verification is indicated at 240. The biometric reader will obtain biometric data from the user while the user is accessing the study course materials. The data will be compared by the biometric identification program against earlier biometric data taken of the user. The earlier data could have been taken by the biometric reader before launching the web browser. Alternatively, the earlier data can be obtained from a third party database, such as the database of a governmental agency or a database of a private company that stores biometric data. If the biometric data is an image of the user's face, the earlier data can represent an image of photo from the user's driver's license or other photo identification taken by the biometric reader, which can be a camera. For example, the user can hold his drivers license up to the camera which can image the license or just the photograph pictured on the license. Alternatively, a card reader communicating with the user's computer can be used to obtain data from a smart identification card, such as a drivers license having data stored on it. The card reader can obtain earlier biometric data, such as data representing one or more characteristics of the individual's face, fingerprints, signature, hand geometry, or voice from the smart identification card.

If the earlier image is an image of a photograph pictured on an identification card or some verified biometric data from a third party database, then an identification of the individual can be made, rather than just a verification that the person in the second set of data is the same as the person in the first set of data. Furthermore identity can be verified by matching biometric data with verified or authenticated biometric data.

As part of the process at 240, the biometric identification program compares the two separate sets of data to indicate a verification. If a verification is indicated at 234 then further access to course materials is permitted, and the verification process is repeated either periodically or continuously. For example, a camera can take an image of the user every five, ten, fifteen, or thirty minutes and compare it in real-time against an earlier image. Alternatively, the camera can take images continuously, such as every millisecond, and compare them in real-time against the earlier image or images until the user either voluntarily decides to stop accessing the web site and shuts down the biometric identification program, or the biometric identification program fails to make a verification.

If a verification fails, as indicated at 235, then either the reader is deactivated by the BIP, as indicated at 245, or the BIP shuts itself down, as indicated at 270. The deactivation of the reader 245 results in one of three alternative actions. In a first action, the deactivation of the reader can signal the BIP to change the imbedded value from an access value to a decline value or no value, as indicated at 250. Therefore, when the next web page is requested and the CGI script analyzes the access/decline value data field, it does not recognize the access value and signals the web site server to deny access to the next web page of course materials, as indicated at 275. Alternatively, the deactivation of the reader can signal the biometric identification program to shut down the browser, as indicated at 255. This results in the discontinuation of further access to the online course and, consequently the study course materials on the web site, as indicated at 275. Alternatively, the deactivation of the camera can signal the BIP to pass a verification failure message to the central server, as indicated at 260. The verification failure message signals the central server to deny further access to the course materials, as indicated at 275.

If the BIP is shut down, as indicated at 270, then it can signal the browser to shut down along with it. Alternatively, the browser can remain in operation, but the web site server will transmit only one more web page to the user's computer. That is because the BIP is shut down and consequently cannot populate the access/decline value data field in the next web page with an access value.

In an alternative embodiment, the central server can continue to grant access to course materials in response to the deactivation of the reader or the shutting down of the BIP, but can transmit a notice to the user at a later time that identity verification has failed, and that he or she will not be provided with credit for the course or a certificate of course completion. The notice can be provided electronically, by telephone, or by regular mail. Thus, the user continues to take the course not realizing that he or she will not be provided with course credit or a certificate of course completion. This alternative embodiment is a further deterrent to tampering with the identity verification protocol or attempting to have an imposter take the course.

In one embodiment, as described above, the biometric reader can be a camera. The camera can be activated by the BIP or by the user at 205. The BIP automatically (or the user manually) launches a web browser at 210, and requests access to a control panel web page from a central server that provides an online study course at 220. The BIP can be a face recognition program. The BIP populates a data field imbedded in the web page with an access value if the camera is on and a decline or no value if the camera is off at 230. If the data field is populated with a decline value, access to the next web page is denied at 275. If the data field is populated with an access value, access is granted at 233, and the identity verification operation goes into effect at 240. The camera is pointed toward the user and takes one or more images of the user. Those images are compared against earlier images of the user. The earlier image(s) can be taken by the camera before request for access to the course materials is made. Alternatively, the earlier image can be an image of a photo from the user's photo identification card, such as a driver's license card, taken by the camera. Alternatively, the earlier image can be retrieved from a third party database or from the memory of a smart identification card interfacing with a card reader connected to the user's computer. The face recognition program compares the first set of images against the second set of images and if verification is made, as indicated at 234, then access to course materials is maintained, and the user can obtain access to further web pages. If verification fails, as indicated at 235, then either the camera is deactivated by the BIP at 245 or the BIP shuts itself down at 270. Once the camera is deactivated, the BIP causes the browser to pass a verification failure message or modifies the imbedded value to a "decline" value or password, as indicated at 260 and 250 respectively. This causes the central server to deny further access, as indicated at 275. Alternatively, the deactivation of the camera at 245 causes the BIP to shut down the browser, as indicated at 255, which causes the central server to deny further access, as indicated at 275.

Figure 4:
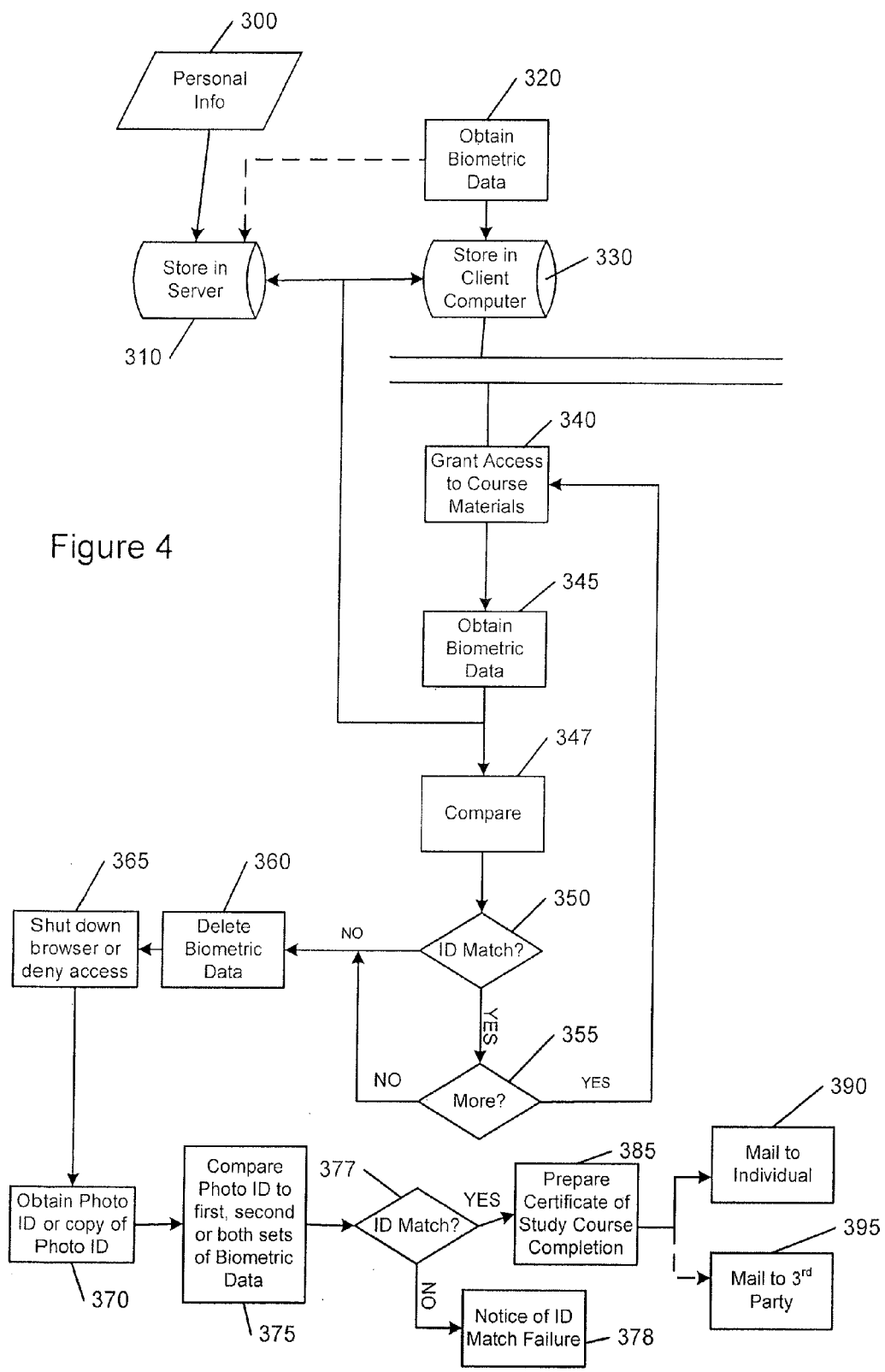
FIG. 4. is a flow chart of a computerized method for verifying the identity of an individual taking a study course over a global computer network according to one embodiment.

FIG. 4 is a flowchart that illustrates the steps taken in a method for verifying and identifying an individual taking a study course over a global computer network, such as the Internet. Initially, at the first operation 300, the method involves obtaining personal information from the user, such as name, address, telephone number, email address, drivers license number, social security number, and the like. As noted above, this can be achieved through data entry at a control pane web page. At 310, that information is stored in a database in the memory of a central server.

A first set of biometric data representative of one or more physical characteristics of the user is obtained using the user's computer at 320. For example, the first set of biometric data could represent an image of the user's face, a fingerprint of the user, the user's voice, the user's signature, the user's hand geometry, or characteristic of the user's eye, such as the iris. The first set of biometric data is stored on the user's computer at 330. It can also be transmitted to the central server over a global computer network and stored 310 there as well.

The first set of biometric data can be obtained 320 in several alternative ways. First, it can be obtained by a biometric reader connected to the user's computer. Second, it can be obtained by a card reader that reads an identification card imbedded with biometric data of the user. Third, it can be obtained from a third party database that stores biometric data. Such a database could be a governmental agency computer database or the database of a private organization or company that stores biometric data. The personal information provided by the user can be used to identify and obtain the biometric data corresponding with the user from the third party database. Fourth, the biometric reader can be a camera that takes an image of the individual's photo identification card, such as a drivers license, and uses the image of the photo identification as the first set of biometric data. Other techniques for obtaining biometric data will occur to those skilled in the art.

The next step 340 is to grant access to the study course materials. Thus, a next web page containing course materials will be served to the user's computer. Next, at 345, while the user is accessing study course materials, the biometric reader is used to obtain a second set of biometric data from the user. The second set can be stored in the memory of the user's computer, and it can also be stored in the memory of the central server, if desired. A biometric identification program then compares the first set of biometric data with the second set of biometric data at 347. If there is an identification match at 350, a "yes" outcome at 350, and the user wants further access 355 to course materials, a "yes" outcome at 355, then further access is granted at 340. The user can indicate that he or she wants more access by, for example, doing nothing and thus maintaining the web page currently viewed beyond a predetermined time limit. Other means of requesting further access could, for example, comprise clicking on a continue button, clicking on a "next page" button, scrolling down a web page, or various other mechanisms known to those of skill in the art. Steps 340 to 355 can be repeated periodically, between relatively long intervals, such as every five, ten, fifteen, or thirty minutes. Alternatively, steps 340 to 355 can be repeated continuously, such as every millisecond. For example, if the biometric reader is a camera, the camera can take images at, e.g., ten frames per second or more, while the biometric identification program runs the comparison in real-time every millisecond.

If the biometric identification program fails to make a match (i.e., verification), a "no" outcome at step 350, or fails to make a series of matches, or if the user wants to exit the program, a "no" outcome at 355, then the first set of biometric data is deleted from the user's computer at 360, and further access to course materials is denied at 365. In addition, the second set of biometric data may also be deleted. It should also be noted that the steps of denying further access at 365 and deleting the first set of biometric data from the user's computer at 360 can be reversed in sequence.

If the biometric data comprises facial images, then once the user has completed the study course materials and does not desire further access to course materials, a "no" outcome at step 355, the next step after deleting the biometric data at 360 and denying further access at 365 can be to obtain a photo identification or copy thereof from the user at 370. The photo identification or copy thereof can be transmitted either by mail to the online education provider, or it can be electronically transmitted to the central server. Alternatively, the central server can access a third party database that stores biometric data, such as the databases of the Department of Motor Vehicles or some other governmental agency or private biometric data storage company. The photo identification data is compared with the first, the second, or both the first and second sets of biometric data at 375 to verify the identity of the user. This can be an automated process using a face recognition program, or it can be done manually. If there is an identification match, a "yes" outcome at 377, then a certificate of study course completion is prepared at 385, and it is sent either by regular mail or electronically to the individual at 390. The certificate can also be mailed to a third party at 395 that may require proof of course completion, such as the Department of Motor Vehicles. As indicated in FIG. 4, the photo identification can be obtained after further access to the course materials is denied (or the course is completed) at step 370, or it can be obtained before the course is completed (not shown). Comparing the photo identification with the first, the second, or both the first and second sets of data after course completion provides the added benefit of reducing preliminary inconveniences to the user, thus promoting the use of the online education provider's web site.

In some embodiments, the certificate can include an image representing the first or second sets of biometric data. For example, the certificate can include an image of the user's face, eye(s), signature, hand geometry, or fingerprints.

If verification fails at step 377, then a notice of identification failure is sent to the user at 378.

Figure 5A:
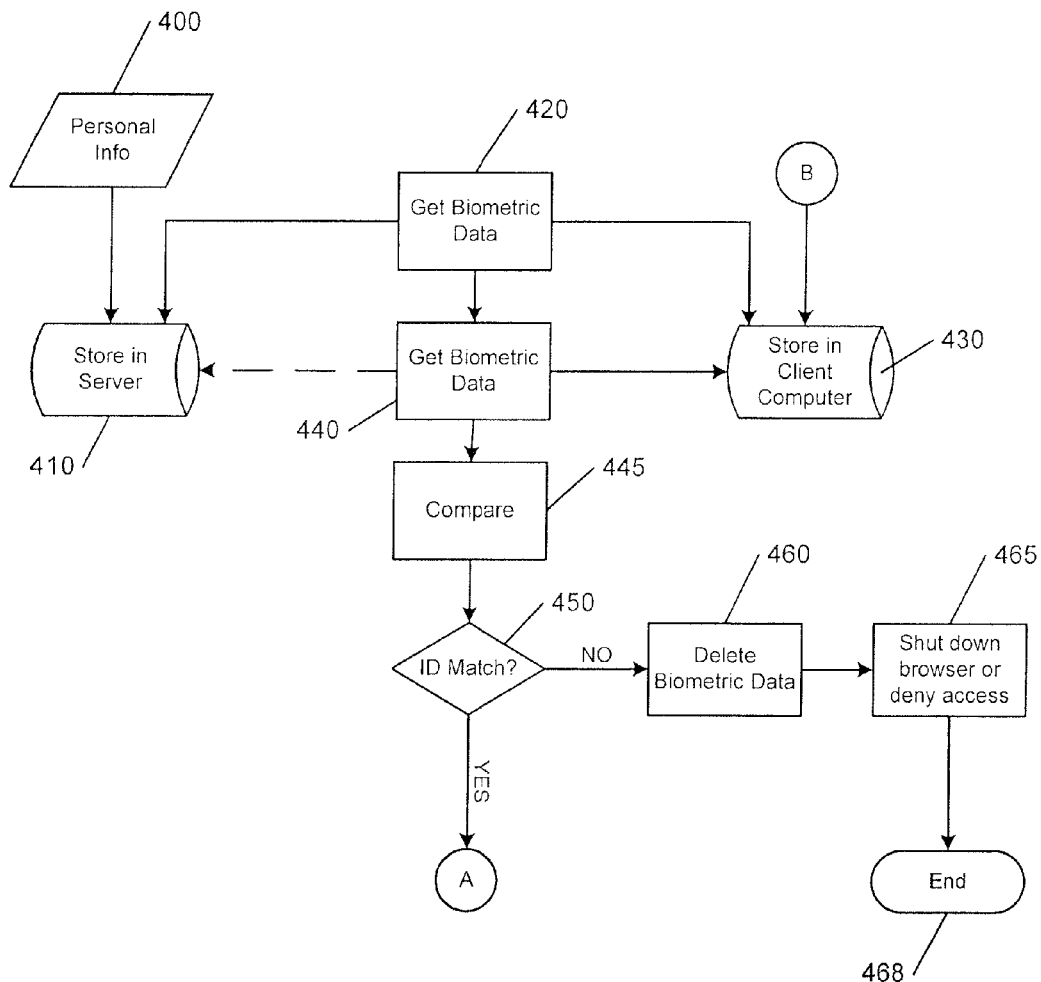
FIGS. 5A-5B represent a flow chart of a computerized method for verifying the identity of an individual taking a study course over a global computer network according to another embodiment.
Figure 5B:
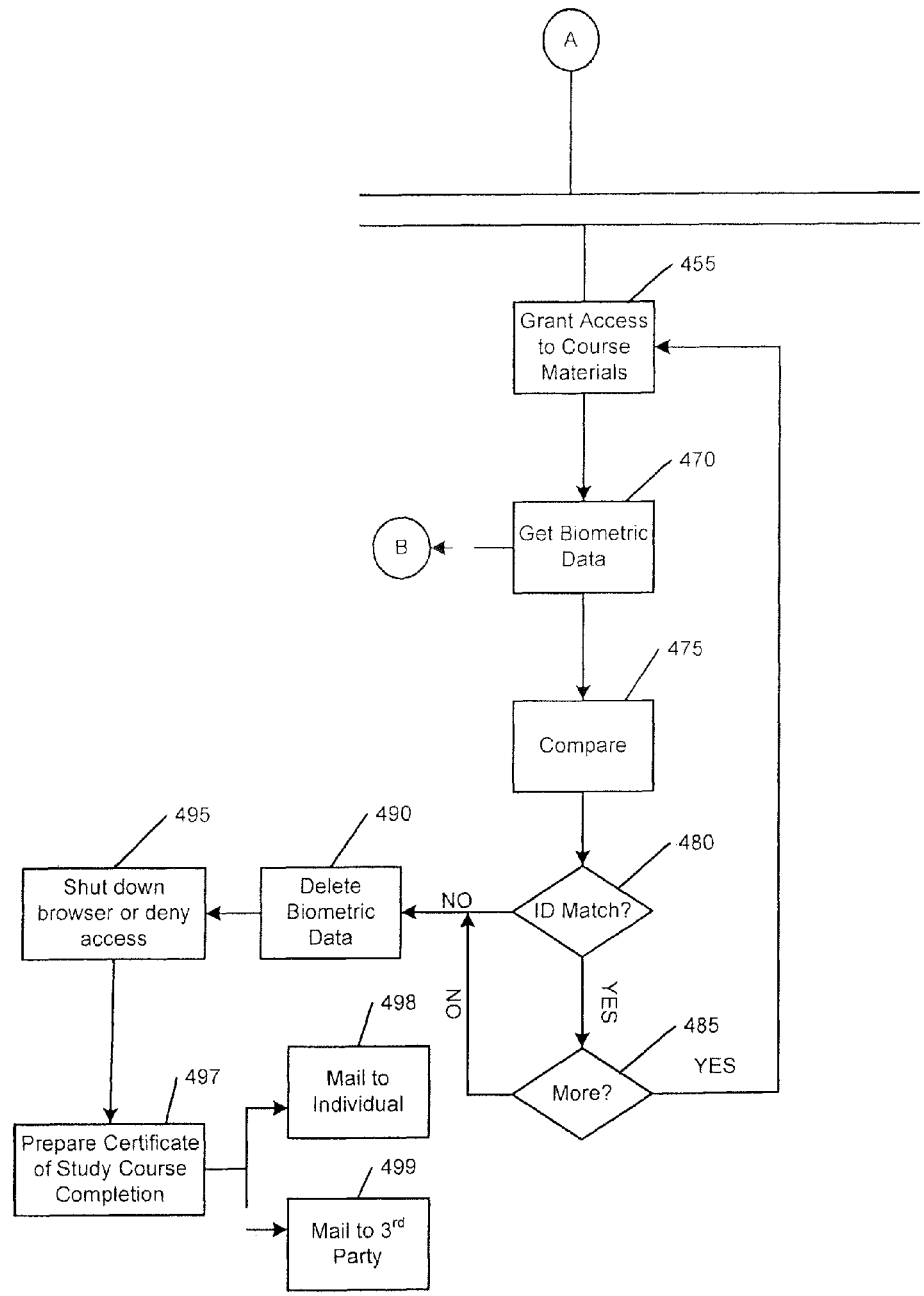

FIGS. 5A and 5B are a flowchart that illustrate another embodiment of the invention. Initially, beginning with the operation at 400, the method involves obtaining personal information from the user, such as name, address, telephone number, email address, drivers license number, social security number, and the like. At 410, that information is stored in a database in the memory of a central server.

At 420, a first set of biometric data representative of one or more physical characteristics of the user is obtained using the user's computer. For example, the first set of biometric data could represent an image of the user's face, a fingerprint of the user, the user's voice, the user's signature, the user's hand geometry, or characteristic of the user's eye, such as the iris. The first set of biometric data can be obtained at 420 using a biometric reader connected to the user's computer. For example, the biometric reader can be a camera, a fingerprint reader, a microphone, an eye scanner, an electronic signature pad, or a hand scanner.

Next, at 430, the first set of biometric data is stored on the user's computer. It can also be transmitted to the central server over a global computer network and stored there as well. The purpose of storing the first set of biometric data in the memory of the central server is that it prevents the user from being able to alter the data on his own computer after terminating communication with the central server. Once communication is terminated, the biometric identification program can cause the first set of biometric data to be deleted from the user's computer, and when the user attempts to re-access the course material at a later time, the central server will transmit a copy of the first set of biometric data to the user's computer. Thus, the user cannot alter or manipulate the data.

The next step at 440 is to obtain a second set of biometric data. This second set of biometric data can be obtained in several alternative ways. First, it can be obtained by a card reader that reads an identification card imbedded with biometric data of the user. Second, it can be obtained from a third party database that stores biometric data. Third, it can be obtained by imaging a photo identification card of the user.

After the second set of biometric data is stored in the user's computer or in the memory of the central server, a biometric identification program compares the first set of biometric data with the second set of biometric data at 445. If the first and second sets of biometric data are stored in the central server, then the biometric identification program is executed by the central server. If the first and second sets of biometric data are stored in the user's computer, then the biometric identification program is executed by the user's computer. If the biometric identification program fails to make a match between the two sets of data, a "no" outcome at step 450, or fails to make a series of matches, then the first set of biometric data is deleted from the user's computer at 460, and at 465 the browser is either shut down or further access to course materials is denied. The access process ends at 468. In addition, the second set of biometric data may also be deleted. It should also be noted that the steps of shutting down the browser at 465 and deleting the first set of biometric data from the user's computer at 460 can be reversed in sequence.

If there is a match between the two sets of data, a "yes" outcome at step 450, then access to course study course materials is granted at 455 (FIG. 5B). Next, while the user is accessing study course materials, the biometric reader is used to obtain an additional set of biometric data from the user at 470. This data can be stored in the memory of the user's computer (indicated by the connector B to FIG. 5A), and it can also be stored in the memory of the central server. The biometric identification program then compares the additional set of biometric data with the first, the second or both the first and second sets of biometric data at 475. If there is a match between the two sets of data, a "yes" outcome at 480, and if the user wants more access to course materials, a "yes" outcome at 485, then further access is granted at 455. The user can indicate that he or she wants more access by, for example, doing nothing and thus maintaining the currently viewed web page. Other means of indicating further access is requested could, for example, comprise clicking on a continue button, clicking on a "next page" button, scrolling down a web page, or various other mechanisms known to those of skill in the art. Steps 455 to 485 can be repeated periodically, between relatively long intervals, such as every five, ten, fifteen, or thirty minutes. Alternatively, steps 455 to 485 can be repeated continuously, such as every millisecond. For example, if the biometric reader is a camera, the camera can take images at, e.g., ten frames per second or more, while the biometric identification program runs the comparison in real-time every millisecond. This confirms that the individual's face in real time is live and not simply a static image held in front of the camera.

If the biometric identification program fails to make a match between the sets of data at step 480, a "no" outcome, or fails to make a series of matches, then the first set of biometric data is deleted from the user's computer at 490, the browser is either shut down or further access to course materials is denied at 495, and the process ends at 497. In addition, the second and additional sets of biometric data may also be deleted. It should also be noted that the steps of shutting down the browser at 495 and deleting the first set of biometric data from the user's computer at 490 can be reversed in sequence.

If verification was made throughout the study course process at steps 450 and 480, then a certificate of study course completion is prepared at 497, and the certificate is mailed to the individual at 498, either by mail or electronically. The certificate can also be mailed to a third party at 499 that may require proof of course completion, such as the Department of Motor Vehicles. In some embodiments, the certificate can include an image representing the biometric data. For example, the certificate can include an image of the user's face, eye(s), signature, hand geometry, or fingerprints. If there is failure in the verification at either of steps 450 and 480, then a notice of verification failure is sent to the user instead of a certificate of course completion.

The present invention has been described above in terms of one or more presently preferred embodiments so that an understanding of the present invention can be conveyed. There are, however, many configurations for computer systems and methods for online identity confirmation not specifically described herein but with which the present invention is applicable. The present invention should therefore not be seen as limited to the particular embodiments described herein, but rather, it should be understood that the present invention has wide applicability with respect to online identity confirmation systems and methods generally. Moreover, it will be apparent that certain features of each embodiment can be used in combination with methods and systems illustrated or described in other embodiments. Accordingly, the above description should be construed as illustrative, and not in a limiting sense. All modifications, variations, or equivalent arrangements and implementations that are within the scope of the attached claims should therefore be considered within the scope of the invention.

The invention claimed is:

1. A computerized method comprising:
configuring at least one processor device(s) to perform steps of:
receiving a request from a web browser or computer program for access to a web page or computer program;
obtaining a first set of biometric data in response to said request for access to a web page or computer program;
allowing access to the web page or computer program over the network prior to obtaining the first set of biometric data;
obtaining continuously or periodically one or more additional sets of biometric data while the web page or computer program is being accessed;
correlating one of the one or more additional sets of biometric data with another one of the one or more additional sets of biometric data or with the first set of biometric data; and
denying access to the web page or computer program if one of the one or more additional sets of biometric data does not match another one of the one or more additional sets of biometric data or does not match the first set of biometric data.

2. The method of claim 1, wherein the web page or computer program comprises study course material.

3. The method of claim 2, wherein the web page or computer program comprises traffic study course material.

4. The method of claim 1, wherein the biometric data comprises images of the individual's face, the method further comprising: obtaining an identification card or a copy of an identification card of the individual; and comparing the identification card or the copy thereof with one of the sets of biometric data to verify the identity of the individual.

5. The method of claim 4, wherein the comparison of the identification or the copy thereof with one of the sets of biometric data is performed manually.

6. The method of claim 4, wherein the comparison of the identification or the copy thereof with one of the sets of biometric data is performed using a biometric data recognition program.

7. The method of claim 1, further comprising detecting changes in the biometric data of the individual to confirm that the individual's biometric data is live.

8. The method of claim 1, wherein the first set of the individual's biometric data is an image obtained by imaging an identification card of the individual.

9. The method of claim 1, wherein the first set of the individual's biometric data is obtained before access to the web page or computer program is provided to the individual.

10. The method of claim 1, wherein the first set of the individual's biometric data is obtained after access to the web page or computer program is provided to the individual.

11. The method of claim 1, wherein the web page or computer program comprises study course material.

12. The method of claim 11, wherein the web page or computer program comprises traffic study course material.

13. The method of claim 1, wherein the biometric reader comprises a camera, a fingerprint reader, a microphone, an eye scanner, a signature pad, a keyboard, or a hand scanner.

14. A computer program product embodied in a non-transitory computer-readable storage medium and having a computer-executable instructions recorded on said storage medium for performing a method comprising:
   receiving a request from a web browser or computer program for access to a web page or computer program;
   obtaining a first set of biometric data in response to said request for access to a web page or computer program;
   allowing the individual to access to the web page or computer program over the network prior to obtaining the first set of biometric data;
   obtaining continuously or periodically one or more additional sets of biometric data while the web page or computer program is being accessed;
   correlating one of the one or more additional sets of biometric data with another one of the one or more additional sets of biometric data or with the first set of biometric data; and
   denying access to the web page or computer program if one of the one or more additional sets of biometric data does not match another one of the one or more additional sets of biometric data or does not match the first set of biometric data.

15. The program product of claim 14, wherein the web page or computer program comprises study course material.

16. The program product of claim 15, wherein the web page or computer program comprises traffic study course material.

17. The method of claim 14, wherein the biometric reader comprises a camera, a fingerprint reader, a microphone, an eye scanner, a signature pad, a keyboard, or a hand scanner.

* * * * *